(12) United States Patent
Moon et al.

(10) Patent No.: US 8,478,434 B2
(45) Date of Patent: Jul. 2, 2013

(54) OUTPUT FEEDBACK FREQUENCY CONTROL DEVICE FOR ROTATING MACHINE SPEED CONTROL

(75) Inventors: Young Hyun Moon, Seoul (KR); Chi Hoon Jung, Chungcheongnam-do (KR)

(73) Assignee: Young Hyun Moon, Seoul (KR)

( * ) Notice: Subject to any disclaimer, the term of this patent is extended or adjusted under 35 U.S.C. 154(b) by 339 days.

(21) Appl. No.: 13/013,428

(22) Filed: Jan. 25, 2011

(65) Prior Publication Data

US 2012/0191224 A1 Jul. 26, 2012

(51) Int. Cl.
 *G06F 19/00* (2011.01)
(52) U.S. Cl.
 USPC ................................. 700/42; 700/41; 700/44
(58) Field of Classification Search
 USPC ................................................ 700/41, 42, 44
 See application file for complete search history.

(56) References Cited

U.S. PATENT DOCUMENTS

| | | | |
|---|---|---|---|
| 4,509,126 A * | 4/1985 | Olig et al. | 700/173 |
| 4,755,924 A * | 7/1988 | Hiroi | 700/54 |
| 4,766,863 A * | 8/1988 | Fujimori | 123/339.21 |
| 4,779,595 A * | 10/1988 | Fujimori | 123/436 |
| 5,857,443 A * | 1/1999 | Kono et al. | 123/339.2 |
| 2008/0215188 A1* | 9/2008 | Ito et al. | 700/299 |
| 2012/0191224 A1* | 7/2012 | Moon et al. | 700/42 |

FOREIGN PATENT DOCUMENTS

KR 2001-0010437 2/2001

OTHER PUBLICATIONS

"Improving of power system transient stabilization based on fuzzy gain scheduling PID", M.B.B. Sharifian, Y. Ebrahimi, R. Rahnavard—International Conference on Electrical Engineering, ICEE, Hong Kong (2007).*
Jung, Chi Hoon; "Output feedback PID based Governor Control for Power System Stabilization" Feb. 2010.

* cited by examiner

*Primary Examiner* — Michael D Masinick
(74) *Attorney, Agent, or Firm* — Renner, Otto, Boisselle & Sklar, LLP

(57) ABSTRACT

Provided are an output feedback frequency control device and a speed governor using the same. The output feedback frequency control device includes an integral control unit configured to generate an integral control signal by using a predetermined integral control constant ($K_I$) and an integral quantity of an angular velocity deviation ($\Delta\omega$) of an external device, a differential control unit configured to generate a differential control signal by using a predetermined differential control constant ($K_D$), the angular velocity deviation ($\Delta\omega$) of the external device, and the mechanical power ($\Delta P_m$) of the external device, and a proportional control unit configured to generate a control input (u) for control of an operation speed of the external device by using the angular velocity deviation of the external device, the integral control signal generated by the integral control unit, the differential control signal generated by the differential control unit, and a predetermined control constant (R).

4 Claims, 12 Drawing Sheets

OUTPUT FEEDBACK FREQUENCY CONTROL DEVICE FOR ROTATING MACHINE SPEED CONTROL

BACKGROUND OF THE INVENTION

1. Field of the Invention

The present invention relates to an output feedback frequency control device for a rotating machine speed control.

2. Description of the Related Art

A general frequency control method used in a power plant is a PID control method that feeds back an angular velocity deviation, its integral, and its differential value by using a suitable gain constant. However, differential control is greatly affected by noise. Therefore, differential control is scarcely used, due to the instability of a differential signal, PI control being chiefly used instead.

However, when the instability of a differential signal is eliminated, frequency control performance can be greatly improved. Therefore, a scheme using an approximate differential signal $df/dt \approx \Delta f/\Delta t$ has been proposed, and a modified PID control method has also been proposed.

FIG. 1 is a block diagram of a frequency control system using the modified PID controller.

The structures and operations of the functional blocks are disclosed in Korean Patent Publication No. 2001-0010437.

However, in the modified PID control method, the control effect depends on the value of $\Delta t$ in approximate differentiation. If the $\Delta t$ value is excessively small, it is difficult to solve the problem of instability. It has been proved that the modified PID control has excellent performance. When the feedback gain (1/R) of a frequency deviation is increased, control is destabilized. However, the modified PID control can secure stability even when the feedback gain (1/R) of a frequency deviation is increased. Also, the modified PID can greatly improve the damping effect of a control system. Thus, if the problem of differential signal instability is solved, the PID control including a differential signal can secure an excellent control effect in speed governor control.

As the complexity of a power system increases, system stabilization becomes more important. A long-term oscillation is an example of system destabilization. A long-term oscillation is correlated with a frequency feedback gain (1/R), and the frequency feedback gain (1/R) is reduced to prevent the long-term oscillation. However, if the frequency feedback gain (1/R) is excessively small, it may solve a portion of the long-term oscillations but the control effect is not efficient enough. A power system stabilizer (PSS) for system stabilization by exciter control has been developed as a fundamental solution thereof and is being widely used. However, because the PSS is controlled on the basis of a linear model in the vicinity of an operation point, it requires frequent tuning of various parameters. If a significant oscillation lasts long time, it may be amplified to cause system instability. However, if the tuning is incorrect, the PSS control may cause a negative effect. In the event of a sudden system change caused by an accident, the tuning is difficult to perform. Also, when the system is in an emergency situation, a heavy load may be applied to a power generator. In this case, an exciter cannot afford to accept a PSS control signal, because the exciter may also be overloaded to control a voltage (In the 2003 North American Blackout, many power generators in Toronto were tripped due to the overloading of exciters).

Thus, PSS-based system stabilization may fail to have noticeable effects in an emergency situation. However, modified PID control can greatly improve power generator damping. Modified PID control can greatly improve system stabilization in association with the PSS. In particular, the modified PID control can secure greater effects when the PSS malfunctions.

SUMMARY OF THE INVENTION

An aspect of the present invention provides a scheme for solving the instability of differential control when using a PID control technique to control the speed of a rotating machine.

Another aspect of the present invention provides a speed governor control scheme for improving a power generator damping effect in terms of system stabilization and power generator life extension.

Another aspect of the present invention provides a control device for providing a hyper-stability scheme that can secure control stability by introducing a nonlinear output feedback control technique that has evolved from a conventional linear PID control technique.

According to an exemplary embodiment of the present invention, an output feedback frequency control device uses a conventional PID control scheme but does not directly use a differential signal. The output feedback frequency control device generates and uses a differential of frequency based on a power generator disturbance equation, thereby providing a differential control effect. This method can eliminate instability due to a noise that may be caused when a differential signal is used in PID control.

According to an aspect of the present invention, a speed governor control system uses an angular velocity deviation ($\Delta\omega$) of an external device and the mechanical power ($\Delta P_m$) and the electric power ($\Delta P_e$) of a turbine-power generator as feedback signals. The speed governor control system includes: an integral control unit configured to generate an integral control signal by using a predetermined integral control constant ($K_1$) and an integral quantity of the angular velocity deviation ($\Delta\omega$) of the external device; a proportional control unit configured to generate a control input (u) for control of an operation speed of the external device by using the angular velocity deviation of the external device, the integral control signal generated by the integral control unit, the differential control signal generated by the differential control unit, and a predetermined control constant (R); a differential control unit configured to generate a differential control signal by using a predetermined differential control constant ($K_D$), the angular velocity deviation ($\Delta\omega$) of the external device, and the mechanical power ($\Delta P_m$) of the external device; and an overall control unit configured to control the signals of a PID control unit including the integral, the proportional and the differential control units.

The overall control unit generates the final control input for control of an operation of the external device by amplifying the signal from the PID control unit by using the predetermined control constant (R).

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Figure 1:
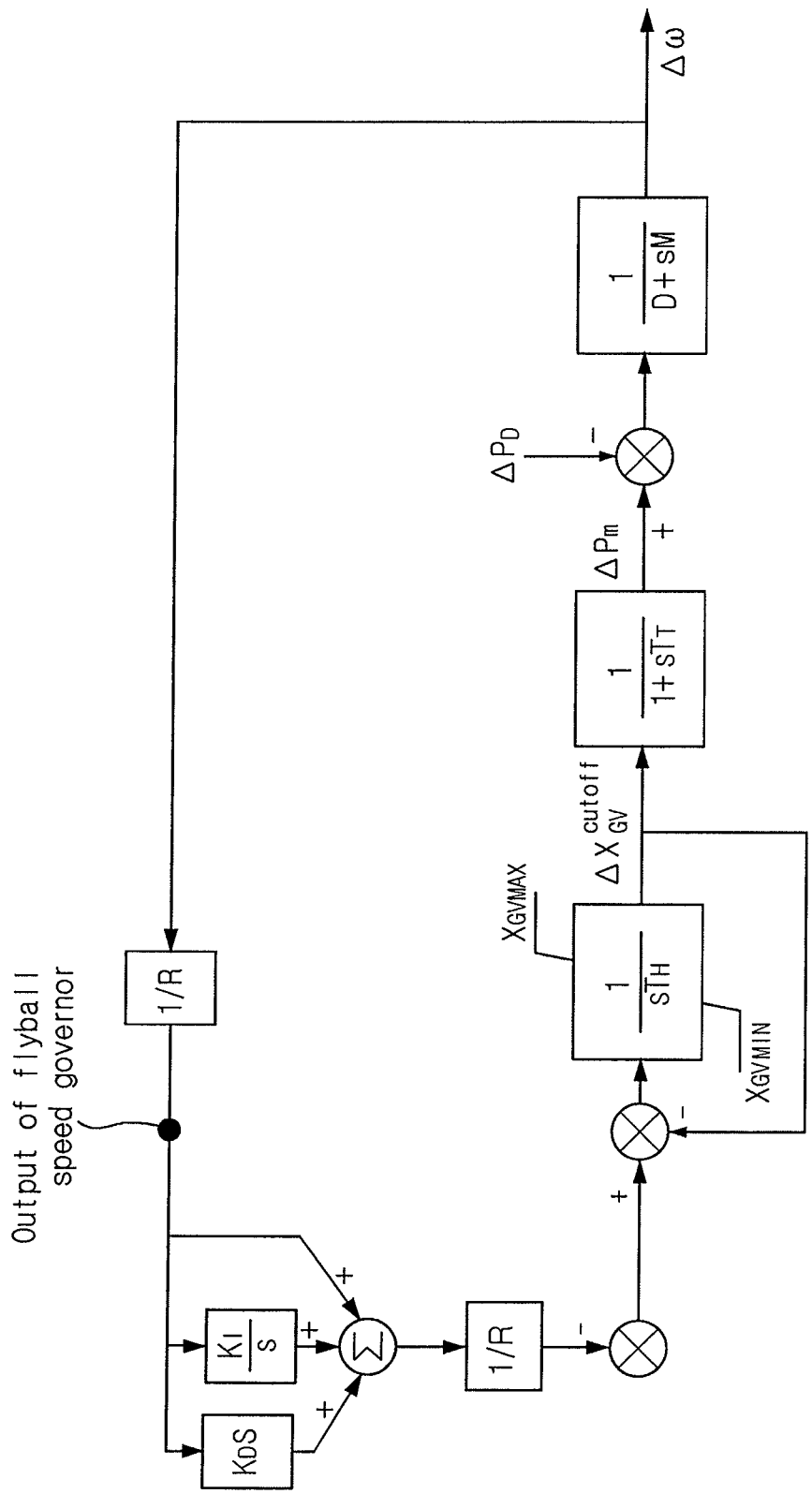
FIG. 1 is a block diagram of a frequency control system using a modified PID controller.

Exemplary embodiments of the present invention will now be described in detail with reference to the accompanying drawings. The invention may, however, be embodied in many different forms and should not be construed as being limited to the embodiments set forth herein. Rather, these embodiments are provided so that this disclosure will be thorough and complete, and will fully convey the scope of the invention to those skilled in the art. In the following description, detailed descriptions of well-known functions or configurations will be omitted since they would unnecessarily obscure the subject matters of the present invention.

Like reference numerals in the drawings denote like elements, and thus their description will be omitted.

Also, when one element is referred to as comprising (or including or having) certain elements, it should be understood that the element may comprise (or include or have) other elements as well as those elements, unless otherwise specified.

The present invention provides a scheme for achieving a modified PID control effect even without using a differential signal. That is, the present invention uses a power generator output feedback to achieve a differential control effect. This method can greatly improve a power generator damping effect, thus greatly contributing to system stabilization together with a power system stabilizer (PSS).

Because a noise may be mixed in at the measurement of an angular velocity, the use of a derivative $$\frac{d\omega}{dt}$$

of the angular velocity obtained by direct differentiation may cause control instability. However, if such control instability is solved, the use of differential control in PID control can improve the damping effect of rotating machine control, thus making it possible to rapidly suppress disturbances (e.g., overshoot and oscillation) caused by a sudden load change. When the output of the rotating machine is nonlinear, it is difficult to use differential control in PID control. The present invention provides a new PID control scheme that makes it possible to use differential control by avoiding the differential instability of a noise in the rotating machine control. Also, the present invention is provided to solve the problem of a process of obtaining an approximate differential signal by a conventional modified speed governor PID controller (See Korean Patent Publication No. 2001-0010437).

PSS parameter tuning is difficult and takes a long time. Therefore, in an emergency situation, a PSS may fail to perform an original function and may have an adverse effect. In the case of a power generator requiring frequent operation stops (e.g., a pumped-storage power plant and a gas turbine), a power generator damping improvement may extend the life of the power generator. A start operation of a power generator always involves a small disturbance that generally continues for tens of seconds to several minutes. Such a small disturbance applies a mechanical force to the internal winding and insulator of the power generator and fatigue accumulates therein, thus reducing the life of the power generator. Thus, if the disturbance is rapidly settled, the life of the power generator can be extended accordingly.

In order to achieve the stability of an output feedback frequency control device of the present invention, a speed governor control system may be reconfigured as a closed-loop system including a linear system and a nonlinear output feedback input. The satisfaction of Popov conditions by the reconfigured control system secures the hyper stability thereof.

Figure 2:
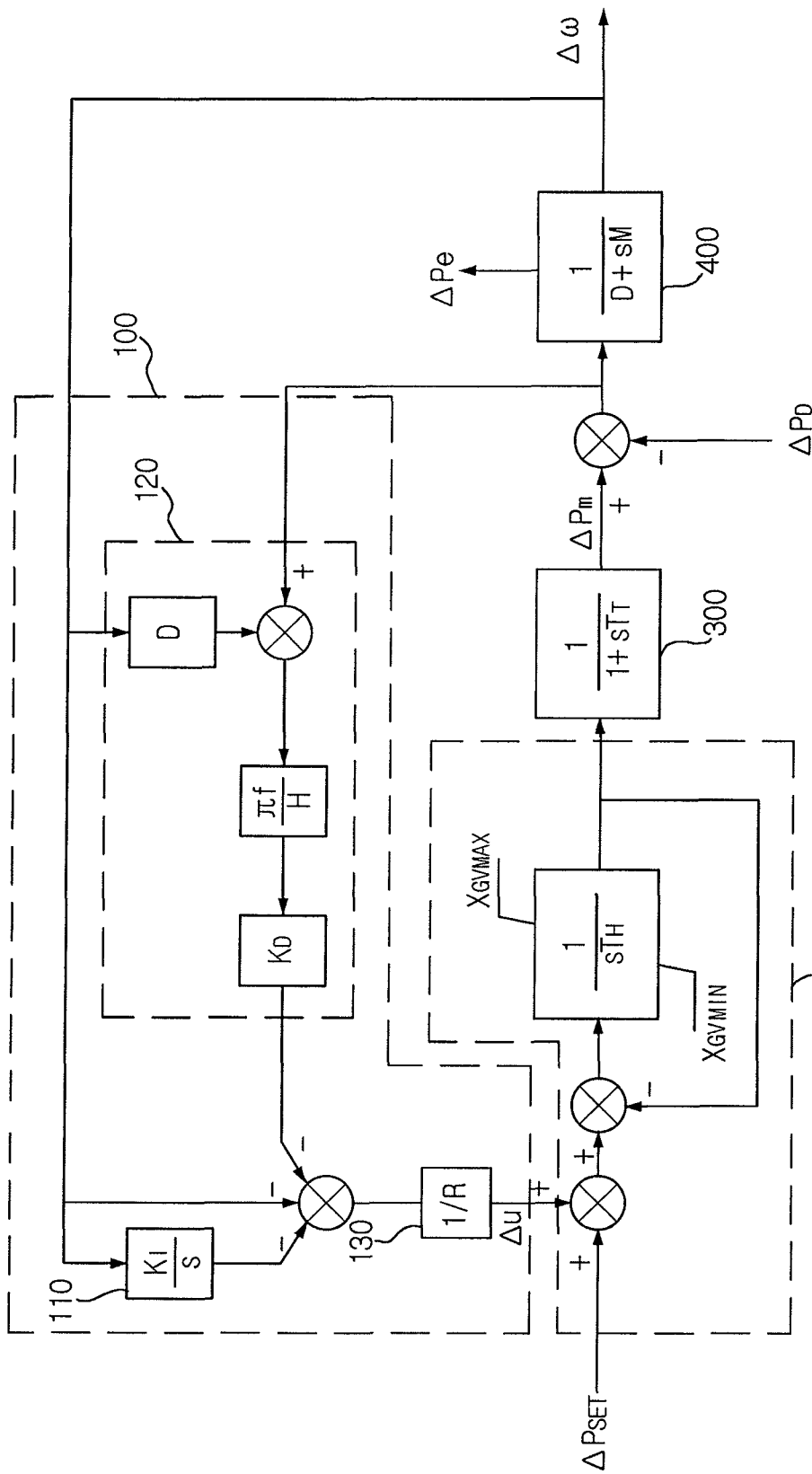
FIG. 2 is a block diagram of a frequency control system using an output feedback frequency control device according to an exemplary embodiment of the present invention.

FIG. 2 is a block diagram of a frequency control system using an output feedback frequency control device according to an exemplary embodiment of the present invention.

Referring to FIG. 2, an output feedback frequency control device 100 according to an exemplary embodiment of the present invention may generate a control input $P_0$ for a speed governor 200. The position of a steam valve of the speed governor 200 is controlled according to the control input $P_0$, and the operation of a turbine 300 is controlled according to the position displacement of the steam valve. Also, a mechanical power $\Delta P_m$ generated by the turbine 300 is inputted to a power generator 400 to change a velocity deviation $\Delta \omega$ of the angular velocity of the power generator 400. Also, because a disturbance $\Delta P_D$ caused by a load change affects the velocity of the power generator 400, the disturbance $\Delta P_D$ may be added to the mechanical power of the turbine 300 and inputted to the power generator 400.

A description of the operations of the speed governor 200, the turbine 300 and the power generator 400 are disclosed in Korean Patent Publication No. 2001-0010437.

A state equation of the conventional modified PID controller is expressed as Equations 1 to 3.

$$\Delta \dot{\omega} = \frac{1}{M}(-D\Delta\omega + \Delta P_m - \Delta P_D) \qquad \text{Eq. 1}$$

In Equation 1, D denotes a damping coefficient, $\Delta P_D$ denotes a disturbance, and $\Delta P_m$ denotes a mechanical input value (mechanical power). Also, M=2H (H: an inertia constant).

$$\dot{X}_{GV} = \frac{1}{T_H}\left(-X_{GV} - \frac{1}{R}\left(\Delta\omega + K_D\Delta\dot{\omega} + K_I \int \Delta\omega dt\right)\right) \qquad \text{Eq. 2}$$

$$X_{GV}^{min} \leq X_{GV} \leq X_{GV}^{max}$$

-continued $$\Delta P_m \frac{1}{T_T}(-\Delta P_m + \Delta X_{GV}) \qquad \text{Eq. 3}$$

Referring to Equation 2, because the conventional modified PID controller uses a differential signal, if a noise is mixed into the system, a control input value may fluctuate, thus destabilizing the entire system. What is therefore required, is a scheme for implementing differential control without using a differential signal.

Thus, the output feedback frequency control device of the present invention uses a swing equation of the power generator 400 to implement differential control. In a general rotating machine, a rotational dynamics equation may be used to derive a differential signal of velocity.

When the swing equation of the power generator 400 is applied to a system using the output feedback frequency control device of the present invention, it gives a relational expression of Equation 4.

$$\frac{H}{\pi f}\Delta\dot{\omega} + D\Delta\omega = \Delta P_m - \Delta P_D \qquad \text{Eq. 4}$$

Referring to Equation 4, a derivative of the angular velocity deviation $\Delta\omega$ for differential control may be expressed using the angular velocity deviation $\Delta\omega$ and a mechanical input value (including a disturbance value).

When Equation 4 is applied to Equation 2, it gives Equation 5.

$$\Delta\dot{X}_{GV} = \frac{1}{T_H}(-X_{GV} - u) \qquad \text{Eq. 5}$$

$$u = \frac{1}{R}\left(\Delta\omega + K_D\frac{\pi f}{H}(\Delta P_m - \Delta P_e - D\Delta\omega) + K_I\int\Delta\omega dt\right)$$

$$X_{GV}^{min} \le X_{GV} \le X_{GV}^{max}$$

In Equation 5, u denotes a control input signal for controlling the steam valve. The signal has a conventional PID control mode, but a differential signal thereof is replaced with an output feedback signal.

In an actual system, a damping coefficient is not easy to measure and may vary according to the system operation state. However, because the damping coefficient is designed to be very small due to the characteristics of the power generator 400 and the turbine 300, the influence of the damping coefficient on a velocity change in the power generator 400 is very small. Thus, when the influence of the damping coefficient is excluded from Equation 5, a control input may be calculated as Equation 6.

$$u = \frac{1}{R}\left(\Delta\omega + K_D\frac{\pi f}{H}(\Delta P_m - \Delta P_e) + K_I\int\Delta\omega dt\right) \qquad \text{Eq. 6}$$

Referring to FIG. 2, the output feedback frequency control device 100 may include a differential control unit 120, an integral control unit 110, and a proportional control unit 130.

The integral control unit 110 may generate an integral control signal by using a predetermined integral control constant $K_I$ and an integral quantity of the angular velocity deviation $\Delta\omega$ of the power generator 400.

The differential control unit 120 may generate a differential signal $\Delta\dot{\omega}$ by using a predetermined differential control constant $K_D$, the mechanical power $\Delta P_m$ of the power generator 400 and the angular velocity deviation $\Delta\omega$ of the power generator 400, and may generate a differential control signal by using the differential signal $\Delta\dot{\omega}$.

The accelerating power of the power generator 400 is equal to the difference between the electrical power $\Delta P_e$ and the mechanical power $\Delta P_m$ of the turbine 300.

Referring to Equation 5, the differential control unit 120 may generate the differential control signal by applying the damping coefficient D, the frequency deviation $\Delta\omega$ and the mechanical input value $(\Delta P_m - \Delta P_D)$ including the disturbance value to $$K_D\frac{\pi f}{H}(-D\Delta\omega + \Delta P_m - \Delta P_e).$$

Referring to Equation 6, the differential control unit 120 may calculate a control input u by using the frequency deviation $\Delta\omega$ and the mechanical acceleration $(\Delta P_m - \Delta P_D)$. Herein, it should be noted that the damping coefficient D is ignorable. The damping coefficient varies according to the system load characteristics and the damping coil of the power generator. Therefore, the damping coefficient is difficult to accurately measure and is difficult to use for actual frequency control.

The proportional control unit 130 may generate the control input u for control of the operation speed of the external device by using the angular velocity deviation $\Delta\omega$ of the power generator 400, the integral control signal generated by the integral control unit 110, the differential control signal generated by the differential control unit 120, and a predetermined control constant R.

Also, the proportional control unit 130 may generate the control input u by adding the integral control signal, the differential control signal and the angular velocity deviation $\Delta\omega$ and multiplying the resulting sum by a frequency feedback gain constant 1/R that is the reciprocal of the control constant R.

The differential control unit 120 can calculate the derivative of the angular velocity deviation $\Delta\omega$ by using the mechanical power, the electrical power and the angular velocity deviation $\Delta\omega$, thus making it possible to solve the problem of a conventional PID control method that may be susceptible to noise.

Hereinafter, a description will be given of the simulation results verifying the control performance of the output feedback frequency control device according to the present invention.

FIGS. 3A to 3D are graphs illustrating the comparison between the performance of a control system using an output feedback frequency control device according to an exemplary embodiment of the present invention and the performance of a control system using a conventional modified PID controller.

The control system using the output feedback frequency control device of the present invention and the control system using the conventional modified PID controller are IEEE WSCC9 (9-bus) systems.

The graphs of FIGS. 3A to 3D illustrate the results of applying a differential control constant of 0.3, an integral control constant of 0.5 and a control constant of 0.05 to the two control systems.

Figure 3A:
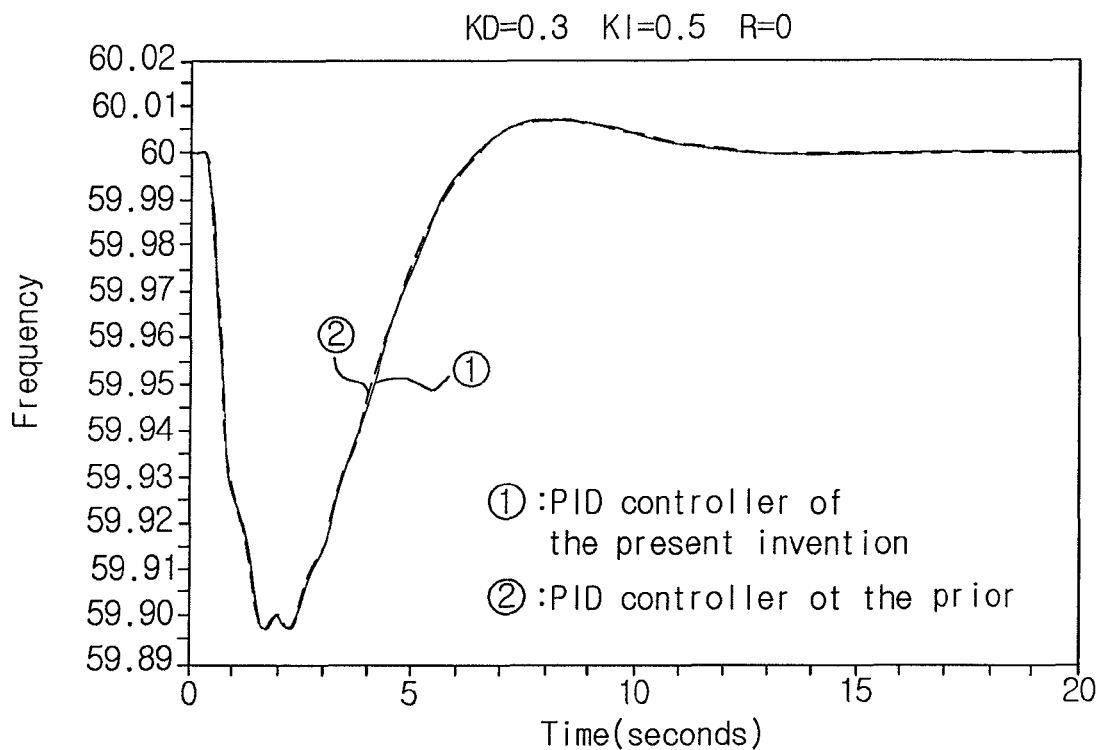
FIGS. 3A to 3D are graphs illustrating the comparison between the performance of a control system using an output feedback frequency control device according to an exemplary embodiment of the present invention and the performance of a control system using a conventional modified PID controller.
Figure 3B:
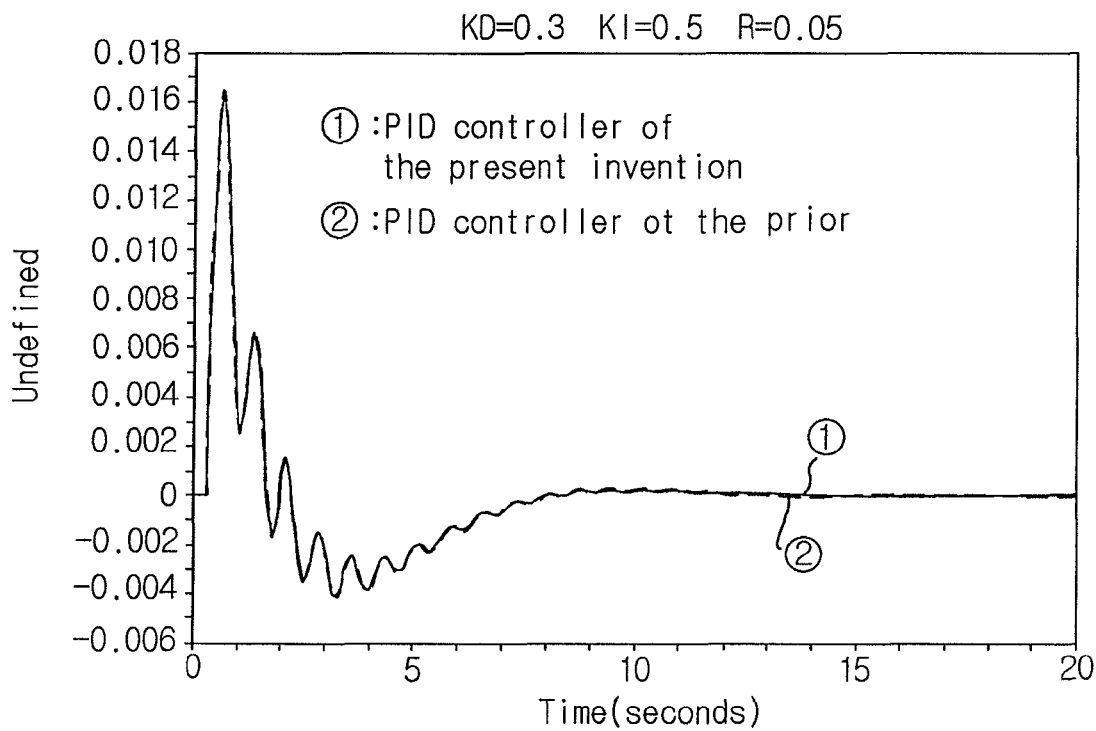
Figure 3C:
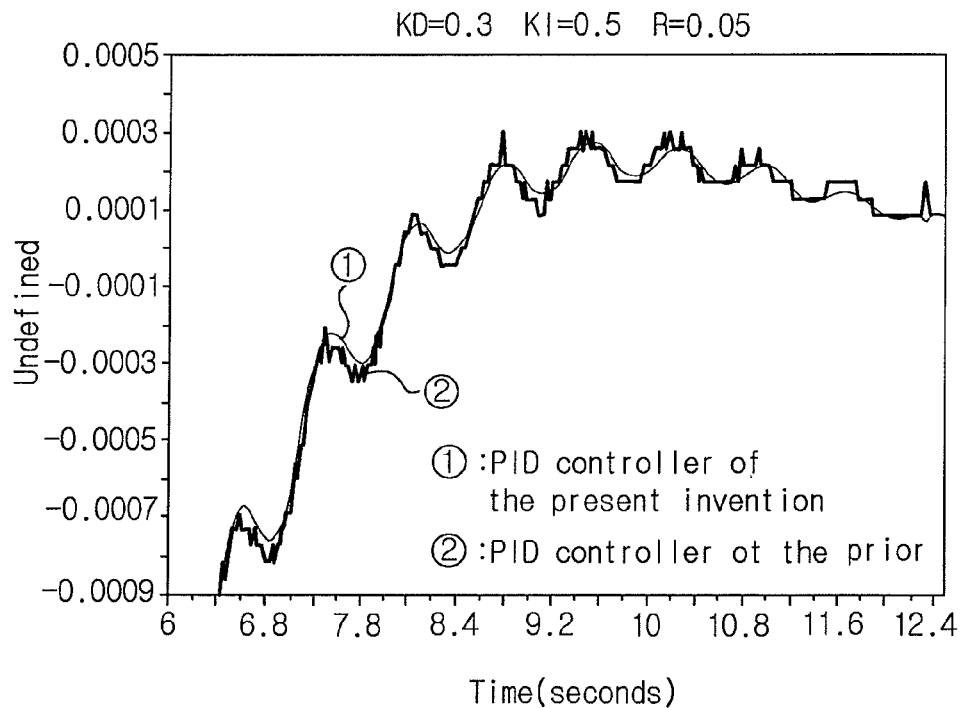
Figure 3D:
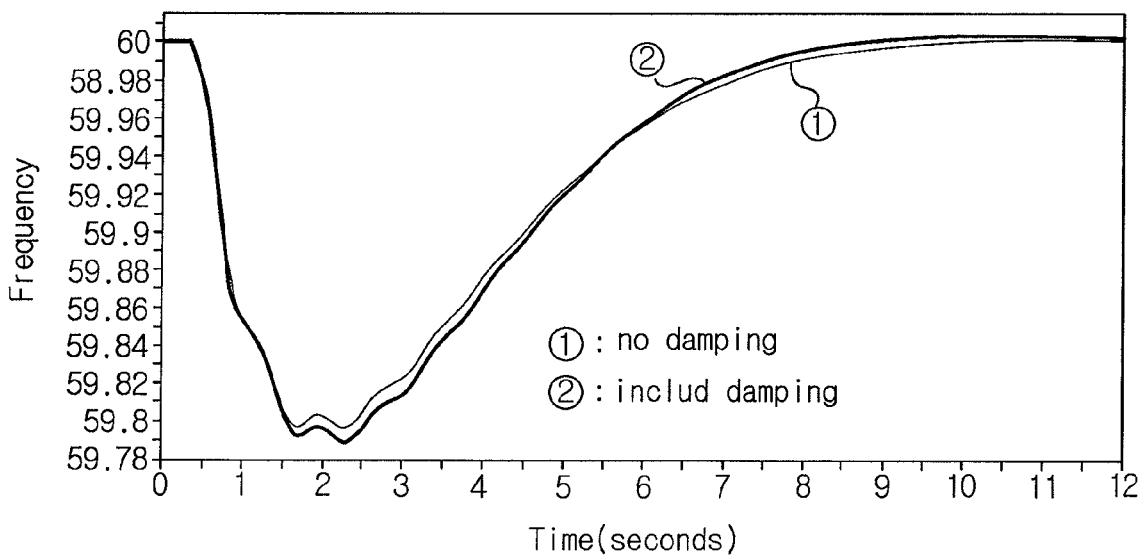

The graphs of FIGS. 3A to 3C illustrate the results of the application of a load deviation of 5% as a disturbance value, and the graph of FIG. 3D illustrates the results of the application of a load deviation of 10% as a disturbance value.

FIG. 3A is a graph illustrating the comparison between the frequency response of the control system using the output feedback frequency control device of the present invention and the frequency response of the control system using the conventional modified PID controller. In this graph, the simulation results of the two methods reveal the same frequency response. That is, it can be seen that the configuration of a velocity derivative $\Delta\dot{\omega}$ through an output feedback can achieve the same effect as the conventional PID control.

FIGS. 3B and 3C are graphs illustrating the comparison between the derivative of the angular velocity deviation $\Delta\omega$ of the control system using the output feedback frequency control device of the present invention and the derivative of the angular velocity deviation $\Delta\omega$ of the control system using the conventional modified PID controller. FIG. 3C is a graph illustrating an enlargement of a section corresponding to a time period ranging from 6 seconds to 13 seconds in the graph of FIG. 3B.

Referring to FIG. 3B, it can be seen that the differential signal of the angular velocity deviation $\Delta\omega$ of the control system using the output feedback frequency control device of the present invention is almost identical to the differential signal of the angular velocity deviation $\Delta\omega$ of the control system using the conventional modified PID controller. Referring to FIG. 3C, it can be seen that the control system using the output feedback frequency control device of the present invention generates a more stable differential signal than the control system using the conventional modified PID controller.

Thus, as compared to the conventional PID controller, the output feedback frequency control device of the present invention can be robust against noise (e.g., a disturbance) because it does not directly use a differential signal. Also, the output feedback frequency control device of the present invention can secure the stability in a wide area because it has about the same transfer function as the conventional modified PID controller.

FIG. 3D is a graph illustrating the frequency responses of the control system using the output feedback frequency control device of the present invention, depending on whether the damping constant is considered. The graph of FIG. 3D reveals that the maximum value and the minimum value of the frequency response in the case of not considering the damping constant according to Equation 6 are only slightly lower than the maximum value and the minimum value of the frequency response in the case of considering the damping constant. This means that, even without considering the damping constant, the control system can provide better performance without departing from the PID control characteristics.

The subsequent simulation result graphs illustrate the results of the control system using the output feedback frequency control device of the present invention that does not consider the damping constant.

The following simulation graphs illustrate the load change and the frequency response corresponding to the cases in which the control devices are applied to three types of systems: a single-machine infinite-bus system, a 9-bus system, and an 11-bus system.

The simulations are results obtained by using a commercial power system simulation analysis package developed by CYME International INC.

FIGS. 4A to 4E are graphs illustrating the simulation of applying an output feedback frequency control device according to an exemplary embodiment of the present invention and a conventional PI controller to a single-machine infinite-bus system.

In general, the use of differential control is prohibited in the control system of the power generator 400. Thus, the output feedback frequency control device of the present invention is compared with a PI controller.

Table 1 shows control constant values for the conventional PI controller and the output feedback frequency control device of the present invention, which are set for simulation purposes.

TABLE 1

| Output Feedback Frequency Control Device of Present Invention | | Conventional PI Controller | |
|---|---|---|---|
| Control Constant | 5% | Control Constant | 5% |
| Differential Control Constant | 0.3 | Differential Control Constant | 0.0 |
| Integral Control Constant | 0.1 | Integral Control Constant | 4 |

The disturbance value is 10% of the total load ($P_D$=5 MW), which is significantly large.

Figure 4A:
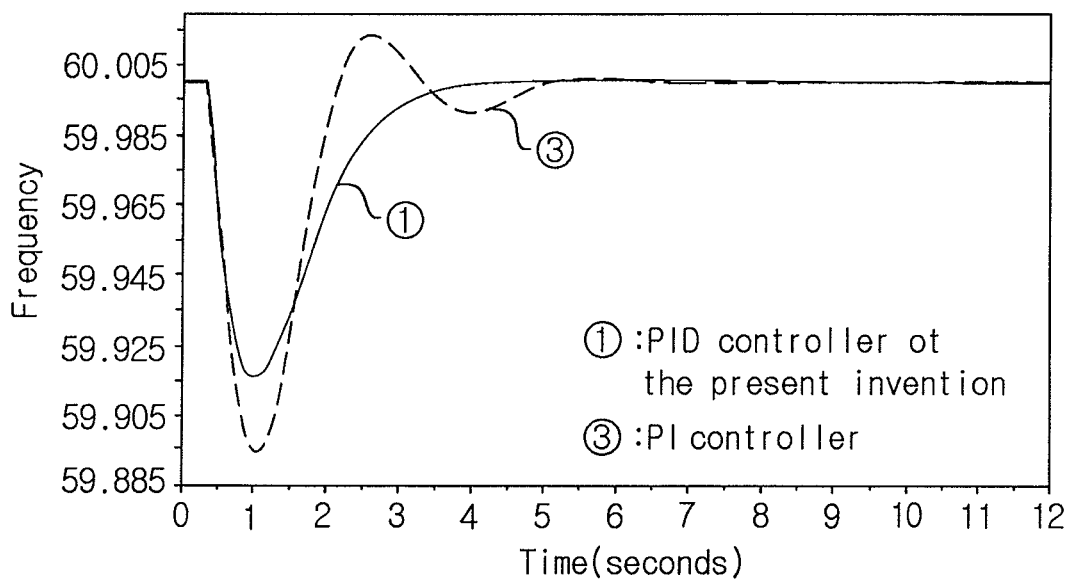
FIGS. 4A to 4E are graphs illustrating the simulation of applying an output feedback frequency control device according to an exemplary embodiment of the present invention and a conventional PI controller to a single-machine infinite-bus system.

FIG. 4A is a graph illustrating the comparison between the frequency response in the case of the application of the output feedback frequency control device of the present invention and the frequency response in the case of the application of the conventional PI controller.

Referring to FIG. 4A, it can be seen that in the case of the application of the output feedback frequency control device of the present invention a steady state maybe reached more rapidly and stably than is the case of the application of the conventional PI controller. The reason for this is that the output feedback frequency control device of the present invention can rapidly respond to a large disturbance because it also includes differential control.

Figure 4B:
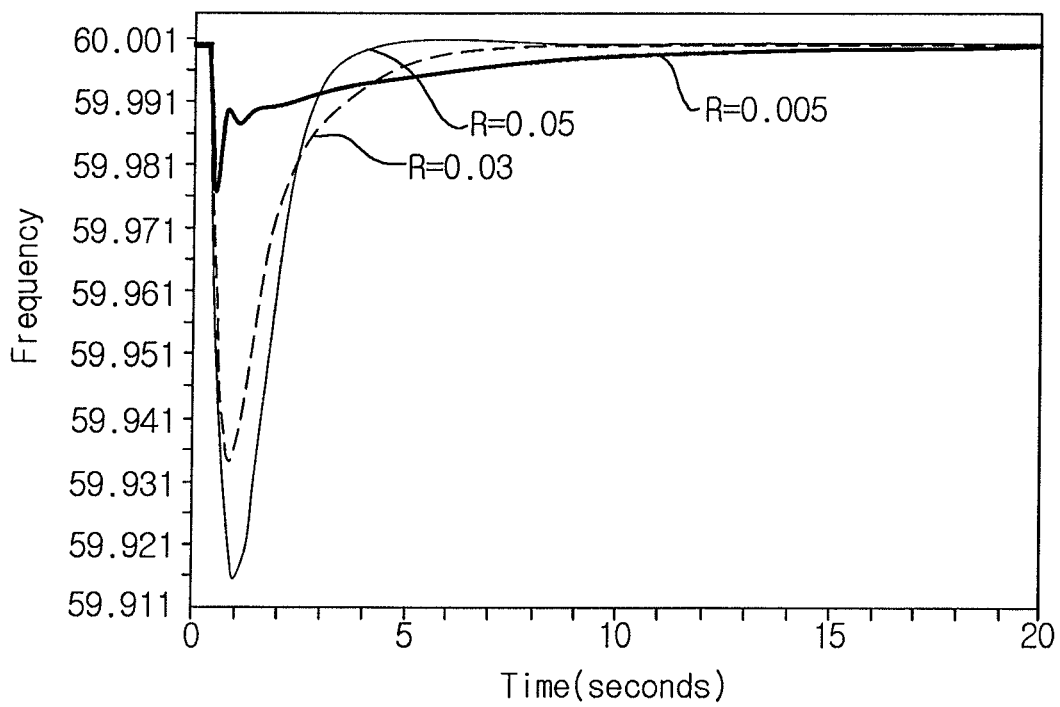
Figure 4C:
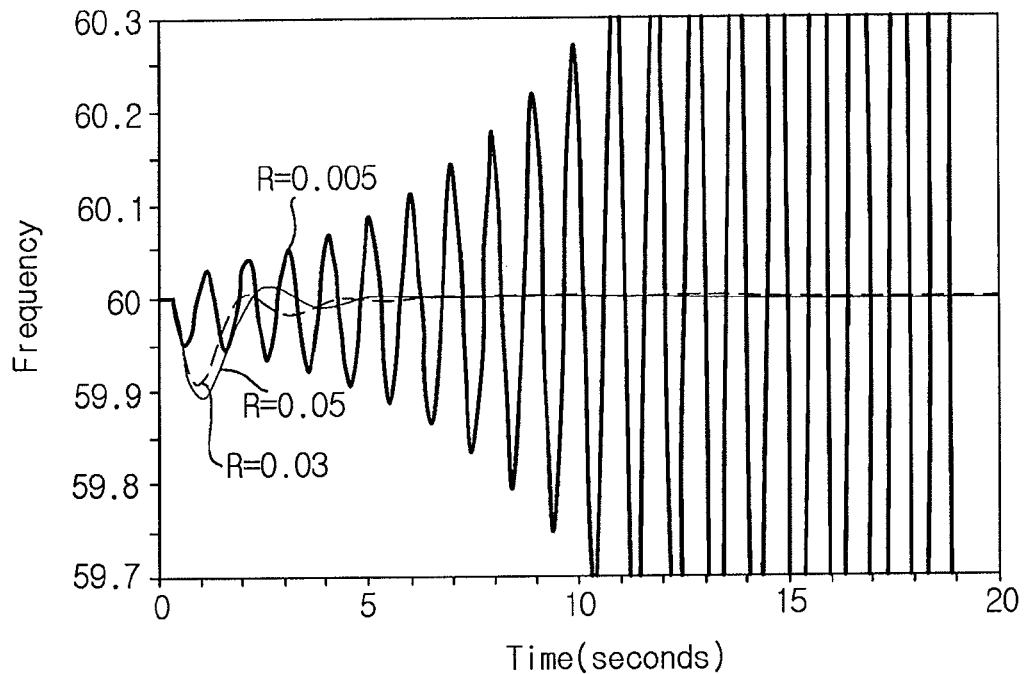

FIGS. 4B and 4C are graphs illustrating the comparison between the frequency response in the case of the application of the output feedback frequency control device of the present invention and the frequency response in the case of the application of the conventional PI controller, depending on control constants.

The control constants are respectively 5%, 3% and 0.5%.

Referring to FIG. 4B, it can be seen that if the output feedback frequency control device of the present invention is applied thereto, the system can be stably controlled even when the control constant value decreases.

Referring to FIG. 4C, it can be seen that if the conventional PI controller is applied thereto, the system is not stabilized, but diverges when the control constant is smaller than a predetermined value.

That is, the output feedback frequency control device of the present invention can stabilize the system with respect to a wide range of control constants, and can prevent system instability caused by a noise.

The performance of the output feedback frequency control device of the present invention and the performance of the conventional PI controller are compared by applying the restriction conditions of Table 2 to the power generator 400 of the control system.

TABLE 2

| Parameter | Value | Parameter | Value |
| --- | --- | --- | --- |
| Power Generator Inertia Constant (H) | 6.0 | Speed Governor Time Constant (TH) | 0.1 s |
| Damping Constant (D) | 2 pu | Turbine Time Constant (TT) | 0.3 s |
| Valve Open Position Limit ($X_{GV}^{open}$) | 1.2 pu | Valve Open Speed Limit ($\dot{X}_{GV}^{open}$) | 0.1 pu/min |
| Valve Closed Position Limit ($X_{GV}^{close}$) | 0.4 pu | Valve Closed Speed Limit ($\dot{X}_{GV}^{close}$) | 1.0 pu/min |

The power generation restriction condition is applied only when steam increases. The above restriction conditions make system control more difficult by causing the control system to operate nonlinearly. Thus, the performance of the output feedback frequency control device of the present invention and the performance of the conventional PI controller can be compared by applying the above restriction conditions.

Figure 4D:
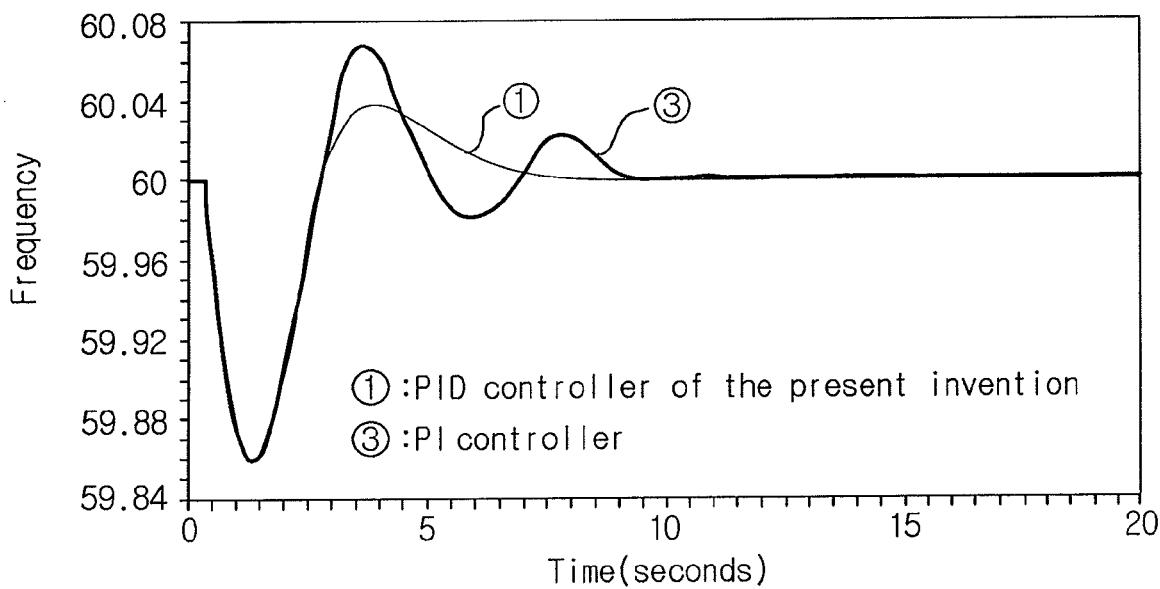
Figure 4E:
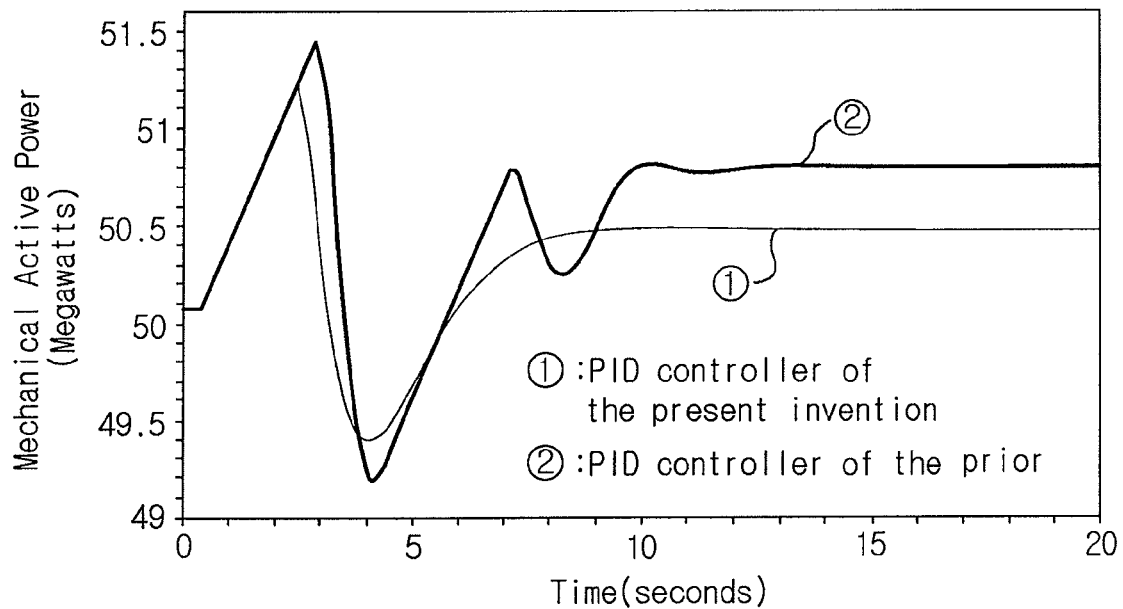

FIG. 4D is a graph illustrating the comparison between the frequency response in the case of the application of the output feedback frequency control device of the present invention and the frequency response in the case of the application of the conventional PI controller, when there are system restriction conditions. FIG. 4E is a graph illustrating the comparison between the mechanical input value in the case of the application of the output feedback frequency control device of the present invention and the mechanical input value in the case of the application of the conventional PI controller, when there are system restriction conditions.

Referring to FIGS. 4D and 4E, it can be seen that the application of the output feedback frequency control device of the present invention provides better control performance than the application of the conventional PI controller, although the overall control performance degrades as compared to the case of not applying the restriction conditions. It can be seen that in the application of the output feedback frequency control device of the present invention, a higher frequency response speed and a lower over-shoot rate may be achieved than in the case of the application of the conventional PI controller.

Figure 5A:
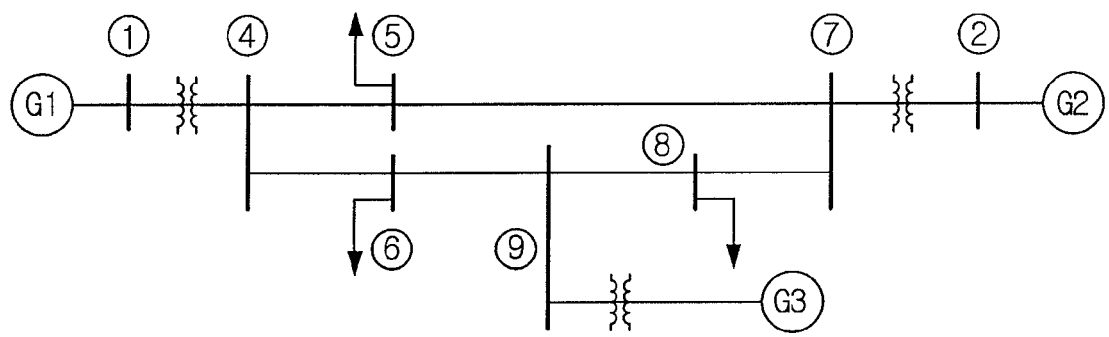
FIG. 5A is a schematic diagram of a WSCC 9-bus system.

FIG. 5A is a schematic diagram of a WSCC 9-bus system.

A WSCC (Western System Coordinating Council) 9-bus model is widely used as a simulation model because it is similar to that of a Korean bus model in terms of system structure and tidal current pattern.

FIGS. 5B to 5F are graphs illustrating the simulation results of applying an output feedback frequency control device according to an exemplary embodiment of the present invention and a conventional PI controller to a WSCC 9-bus system.

The disturbance is set such that it is 10% (31.5 MW) of the total load and is generated at the eighth bus. Table 3 shows parameters applied to controller simulation.

TABLE 3

| Output Feedback Frequency Control Device of Present Invention | | Conventional PI Controller | |
| --- | --- | --- | --- |
| Control Constant | 5% | Control Constant | 5% |
| Differential Control Constant | 0.3 | Differential Control Constant | 0.0 |
| Integral Control Constant | 0.4 | Integral Control Constant | 3.0 |

Figure 5B:
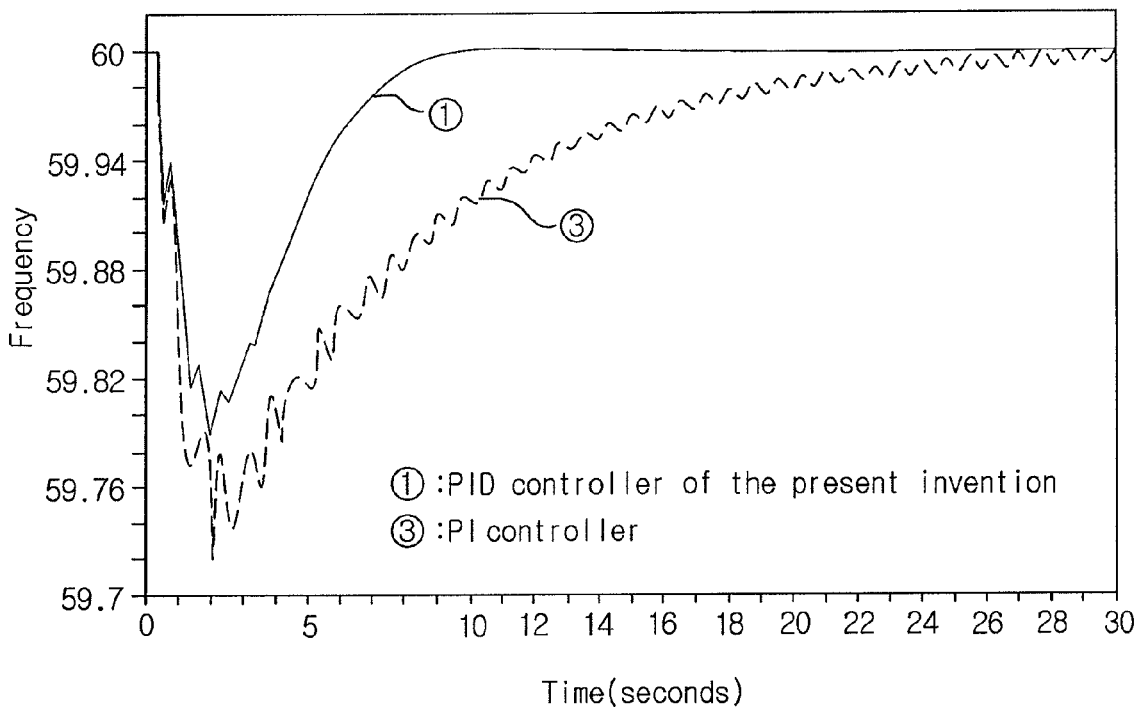
FIGS. 5B to 5F are graphs illustrating the simulation results of applying an output feedback frequency control device according to an exemplary embodiment of the present invention and a conventional PI controller to a WSCC 9-bus system.

FIG. 5B is a graph illustrating the comparison between the frequency response in the case of the application of the output feedback frequency control device of the present invention and the frequency response in the case of the application of the conventional PI controller.

Since a disturbance is generated at the eighth booth, the frequency response of the third power generator with the highest divergence probability is compared.

Referring to FIG. 5B, it can be seen that the output feedback frequency control device of the present invention reaches a steady state more rapidly and stably than the conventional PI controller. Also, it be seen that in the case of the application of the output feedback frequency control device of the present invention, less oscillations may be observed than in the case of the application of the conventional PI controller, because the inertia constant of the power generator is small.

Figure 5C:
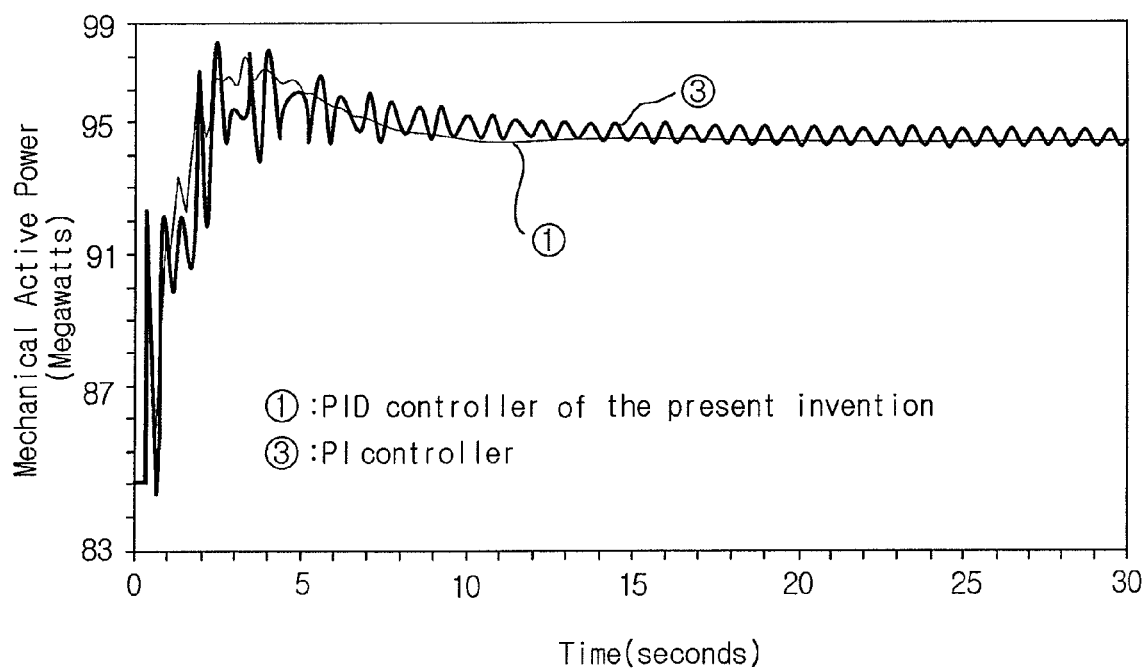
Figure 5D:
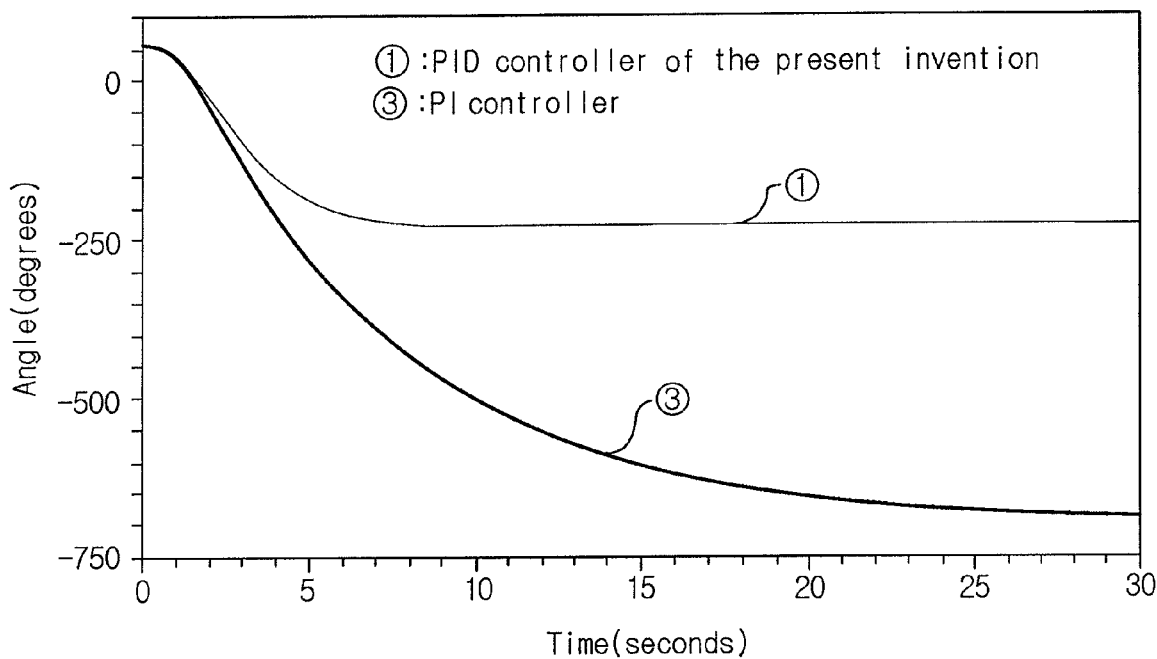

FIGS. 5C and 5D are graphs illustrating the electrical power and the angles of a rotor of the power generator in the case of the application of the output feedback the frequency control device of the present invention and the conventional PI controller.

The electric power means a required load.

Referring to FIG. 5, it can be seen that in the application of the output feedback frequency control device of the present invention, the electric power rapidly converges on a steady state. On the other hand, it can be seen that in the application of the conventional PI controller, the electric power continues to oscillate. That is, the output feedback frequency control device of the present invention can prevent the oscillation thereof by improving the damping of the power generator regardless of the damping constant and the time constant of the power generator. This can remarkably reduce the stress applied to the winding insulator of the power generator, thus making it possible to significantly extend the life of the power generator.

Referring to FIG. 5D, it can be seen that in the case of the application of the output feedback frequency control device of the present invention, stability may be reached more rapidly than in the case of the application of the conventional PI controller.

Figure 5E:
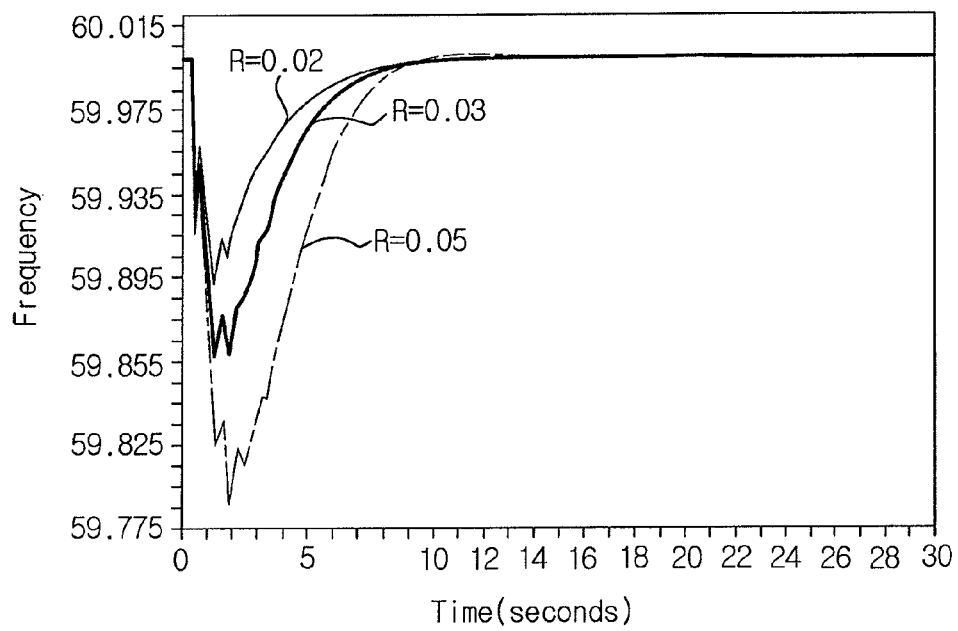
Figure 5F:
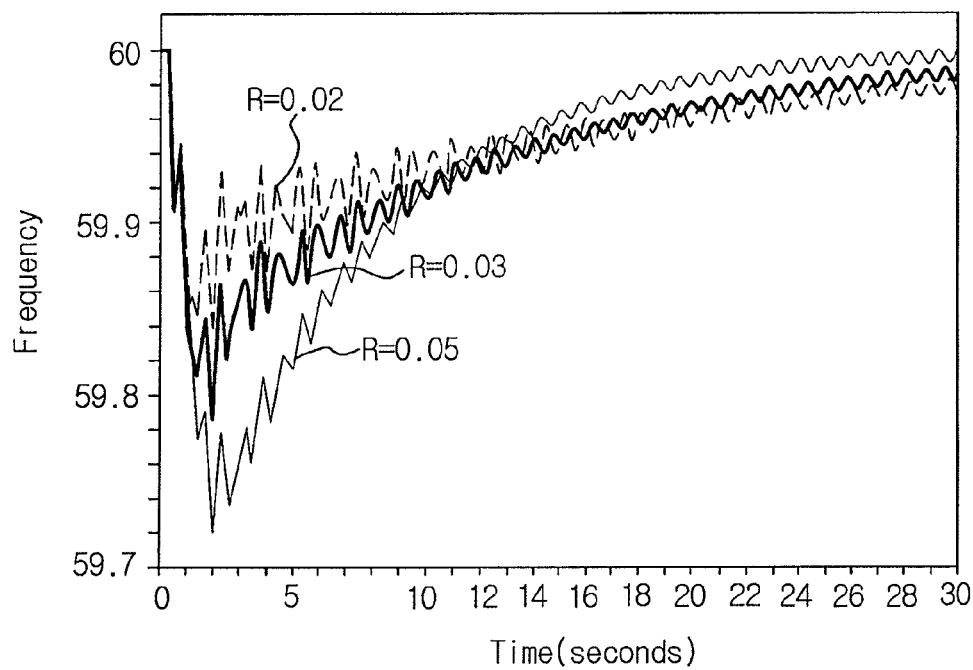

FIGS. 5E and 5F are graphs illustrating the comparison between the frequency response in the case of the application of the output feedback frequency control device of the present invention and the frequency response in the case of the application of the conventional PI controller, depending on control constants.

The control constants are respectively 5%, 3% and 2%.

Referring to FIGS. 5E and 5F, it can be seen that the application of the output feedback frequency control device of the present invention provides good control performance with respect to any control constant. In particular, it can be observed that the output feedback frequency control device of the present invention decreases stabilization time and over-shooting as the control constant decreases. On the other hand, it can be shown that the conventional PI controller deceases over-shooting but increases stabilization time, and the oscillation of a frequency response as the control constant decreases. This means that stable control cannot be performed by failing to improve the damping of the power generator.

Figure 6A:
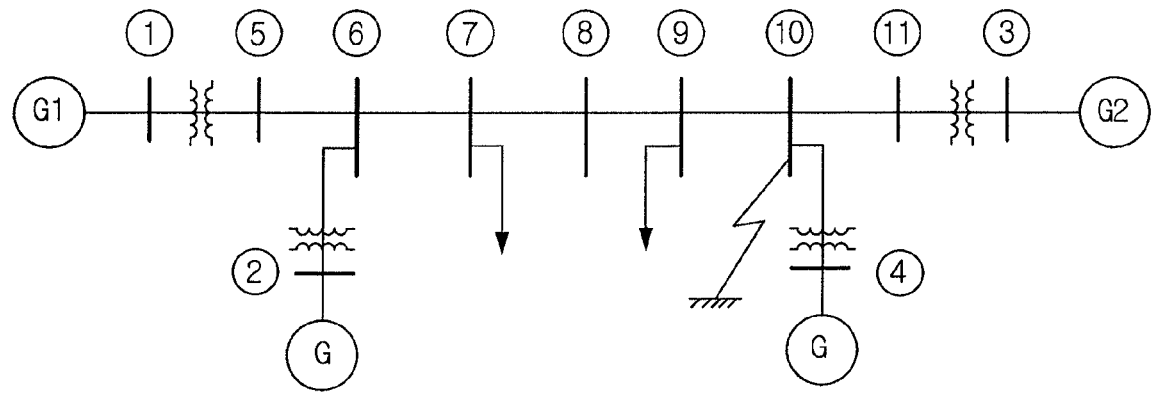
FIG. 6A is a schematic diagram of a Kundur 4-machine 11-bus system.

FIG. 6A is a schematic diagram of a Kundur 4-machine 11-bus system.

Each power generator is a round-rotor synchronous machine.

Referring to FIG. 6A, the system is divided into two regions, and each region includes two power generators. Each power generator includes an IEEE type 1 exciter, and all power generator parameters are the same, except the moment of inertia. Table 4 shows power generator parameters.

TABLE 4

| $X_d$ | 1.8 | $X_q$ | 1.7 | $T'_{d0}$ | 8.0 | $T''_{d0}$ | 0.03 |
|---|---|---|---|---|---|---|---|
| $X'_d$ | 0.3 | $X'_q$ | 0.55 | $T'_{q0}$ | 0.4 | $T''_{q0}$ | 0.05 |
| $X''_d$ | 0.25 | $X''_q$ | 0.25 | H(G1, G2) | 6.5 | H(G3, G4) | 6.175 |

Table 5 shows control constants of the controller.

TABLE 5

| Output Feedback Frequency Control Device of Present Invention | | Conventional PI Controller | |
|---|---|---|---|
| Control Constant | 5% | Control Constant | 5% |
| Differential Control Constant | 0.3 | Differential Control Constant | 0.0 |
| Integral Control Constant | 0.9 | Integral Control Constant | 80 |

It is assumed that 3-phase ground fault occurred at BUS 10 for 0.1 second in order to examine the system damping effect of the output feedback frequency control device of the present invention. A 3-phase ground fault is a serious accident in a power system, and as such, it is good enough to verify the effect of the output feedback frequency control device of the present invention.

FIGS. 6B to 6E are graphs illustrating the simulation results of applying an output feedback frequency control device according to an exemplary embodiment of the present invention and a conventional PI controller to a Kundur 4-machine 11-bus system.

Figure 6B:
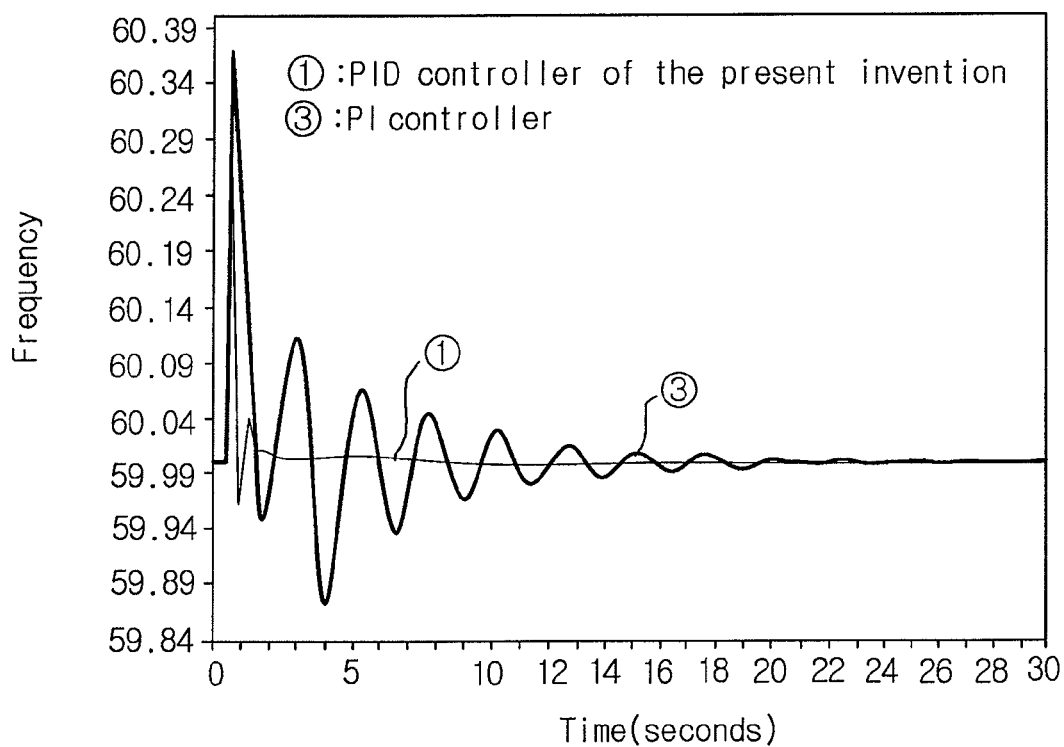
FIGS. 6B to 6E are graphs illustrating the simulation results of applying an output feedback frequency control device according to an exemplary embodiment of the present invention and a conventional PI controller to a Kundur 4-machine 11-bus system.
Figure 6C:
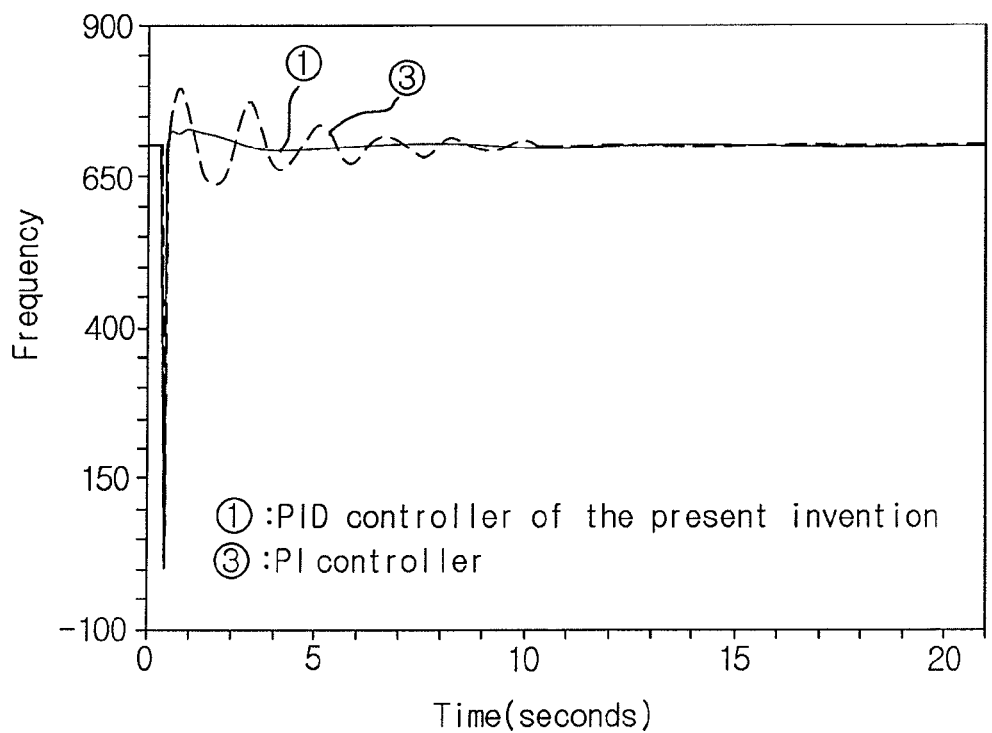

FIG. 6B is a graph illustrating the frequency response of GEN. 4 in the case of the application of the output feedback frequency control device of the present invention and the conventional PI controller. FIG. 6C is a graph illustrating the electric power of GEN. 4 in the case of the application of the output feedback frequency control device of the present invention and the conventional PI controller.

GEN. 4 is a good location to test the system improvement effect of the output feedback frequency control device of the present invention, because it is near to BUS 10

Referring to FIG. 6, it can be seen that, in the event of a disturbance, the output feedback frequency control device of the present invention reaches a steady state more rapidly and stably than does the conventional PI controller.

Referring to FIG. 6C, it can be shown that, in the application of the output feedback frequency control device of the present invention, the system rapidly converges on a steady state. It can also be seen that the conventional PI controller takes 10 or more seconds to remove a frequency disturbance.

Figure 6D:
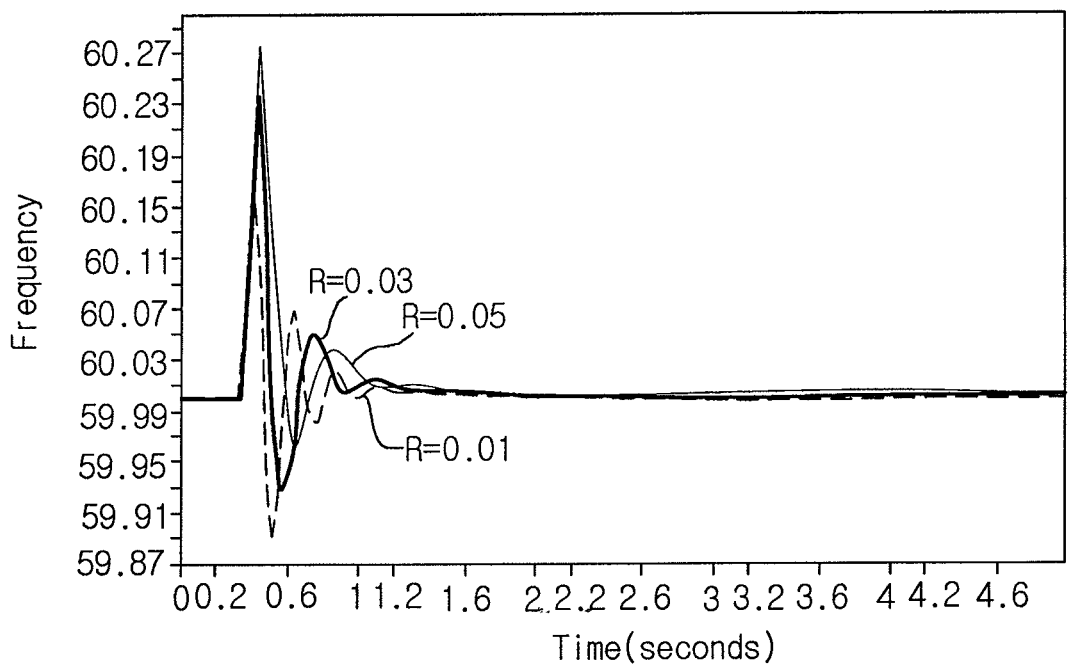
Figure 6E:
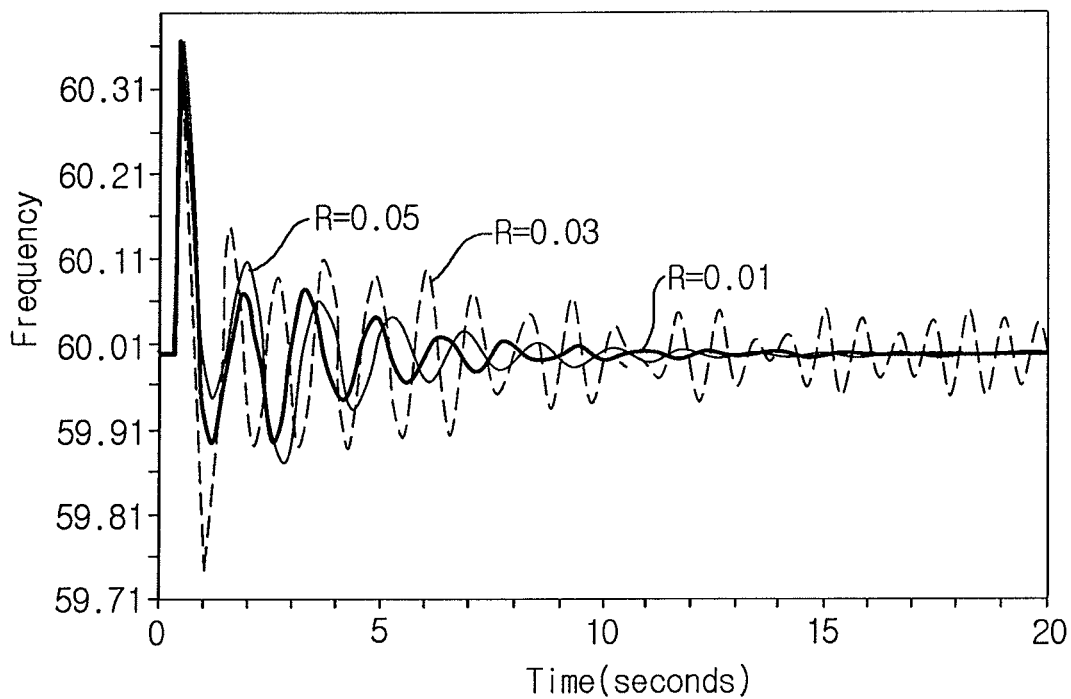

FIGS. 6D and 6E are graphs illustrating the comparison between the frequency response in the case of application of the output feedback frequency control device of the present invention and the frequency response in the case of the application of the conventional PI controller, depending on control constants (R).

The control constants are respectively 5%, 3% and 1%.

Referring to FIG. 6D, it can be shown that the application of the output feedback frequency control device of the present invention provides sufficient control performance in spite of a large disturbance even when the control constant is small.

Referring to FIG. 6E, it can be observed that the system using the conventional PI controller is destabilized with a decrease in the control constant value, and the system oscillates in the event of a large disturbance.

From the root-locus viewpoint, the output feedback frequency control device of the present invention causes the pole of the system to always be located at the left half plane of the s-plane, because it maintains the modified PID control characteristics even for random control constants. On the other hand, in the case of the conventional PI controller, the pole moves to the right half plane of the s-plane when the control constant value decreases.

In the light of the simulation results, the output feedback frequency control device of the present invention provides a stable control effect with respect to all the control constants, as compared to the conventional PI controller. Also, various disturbances (e.g., a load change and a 3-phase short) can be effectively controlled. This means that a sufficient system stabilization effect can be obtained with respect to various disturbances by controlling the speed governor 200 including the output feedback frequency control device of the present invention. In particular, the output feedback frequency control device of the present invention provides a satisfactory control performance in a load frequency control system that considers nonlinearity, such as a steam valve position limit, a steam valve velocity limit, and generator restriction conditions (GRC).

Also, the stability of the output feedback frequency control device of the present invention can be detected through a hyper-stability method.

The hyper-stability method checks a closed-loop system including a linear system and a nonlinear output feedback input, and derives a region securing stability.

When the hyper-stability method is applied, the control constants must satisfy the conditions of Equation 7.

$$R \leq \frac{1}{2} k K_D \frac{\pi f}{H} \qquad \text{Eq. 7}$$

However, because k has a very large value (in the order of $10^4$), it may be said that the output feedback frequency control device of the present invention secures stability in all range of R.

As described above, the output feedback frequency control device of the present invention provides an improved damping effect as compared to the conventional PI controller. In particular, the output feedback frequency control device of the present invention has fixed parameters. Unlike the PSS, the control parameters for a power generator damping improvement do not require separate tuning. Once suitable parameters are determined, they may always be applicable in any situation, thereby contributing to system stabilization. Thus, the proposed speed governor can provide a good control effect with respect to various disturbances of a power system (e.g., a load change and a 3-phase short). Also, the output feedback frequency control device of the present invention provides a satisfactory control performance in a load frequency control system that considers nonlinearity such as a steam valve position limit, a steam valve velocity limit, and generator restriction conditions (GRC).

That is, the output feedback frequency control device of the present invention can provide a sufficient system stabilization effect with respect to various disturbances.

Also, the output feedback frequency control device of the present invention improves power generator damping, thereby making it possible to rapidly reduce the oscillation caused by a system disturbance. This can contribute the extension of the life of a small-sized power generator with frequent operation stops. That is, a start operation of a power generator always involves considerable disturbances and oscillations. Such oscillations apply a mechanical force to the winding insulator of the power generator and fatigue accumulates therein, thus reducing the life of the power generator. However, the output feedback frequency control device of the present invention can effectively suppress the oscillations, thereby making it possible to the life of a power generator with frequent operation stops.

Also, the output feedback frequency control device of the present invention can secure the hyper-stability of a power generator and can implement stable control.

While the present invention has been shown and described in connection with the exemplary embodiments, it will be apparent to those skilled in the art that modifications and deviations can be made without departing from the spirit and scope of the invention as defined by the appended claims.

What is claimed is:

1. An output feedback frequency control device comprising:
    an integral control unit configured to generate an integral control signal by using a predetermined integral control constant ($K_I$) and an integral quantity of an angular velocity deviation ($\Delta\omega$) of an external device;
    a differential control unit configured to generate a differential control signal by using a predetermined differential control constant ($K_D$), the angular velocity deviation ($\Delta\omega$) of the external device, and the mechanical power ($\Delta P_m$) of the external device; and
    a proportional control unit configured to generate a control input (u) for control of an operation speed of the external device by using the angular velocity deviation of the external device, the integral control signal generated by the integral control unit, the differential control signal generated by the differential control unit, and a predetermined control constant (R).

2. The output feedback frequency control device of claim 1, wherein
    the mechanical power ($\Delta P_m$) of the external device is fed back including a disturbance ($\Delta P_D$) ($\Delta P_m - \Delta P_D$), and
    the differential control unit generates the differential control signal by applying the mechanical power ($\Delta P_m - \Delta P_D$) including the disturbance, the angular velocity deviation ($\Delta\omega$), and a damping constant (D) to $$K_D \frac{\pi f}{H}(-D\Delta\omega + \Delta P_m - \Delta P_e)$$

(f: Frequency, H: Inertia Constant, $P_d$: Disturbance, $P_m$: Mechanical Power).

3. The output feedback frequency control device of claim 1, wherein
    the mechanical power ($\Delta P_m$) of the external device is fed back including a disturbance ($\Delta P_D$) ($\Delta P_m - \Delta P_D$), and
    the differential control unit generates the differential control signal by applying the mechanical power ($\Delta P_m - \Delta P_D$) including the disturbance, the frequency deviation ($\Delta\omega$) to $$K_D \frac{\pi f}{H}(\Delta P_m - \Delta P_e)$$

(f: Frequency, H: Inertia Constant, $P_e$: Disturbance, $P_m$: Mechanical Power).

4. The output feedback frequency control device of claim 1, wherein the proportional control unit generates the control input (u) by adding the integral control signal, the differential control signal and the angular velocity deviation ($\Delta\omega$) and multiplying the resulting sum by a frequency feedback gain constant (1/R) that is the reciprocal of the control constant (R).

* * * * *